(12) United States Patent
Rosson et al.

(10) Patent No.: US 9,927,581 B1
(45) Date of Patent: Mar. 27, 2018

(54) CONNECTOR TUNING METHOD AND FERRULE FOR FIBER OPTIC CABLE ASSEMBLIES

(71) Applicant: Corning Optical Communications LLC, Hickory, NC (US)

(72) Inventors: Joel Christopher Rosson, Hickory, NC (US); Thomas Theuerkorn, Hickory, NC (US)

(73) Assignee: Corning Optical Communications LLC, Hickory, NC (US)

( * ) Notice: Subject to any disclaimer, the term of this patent is extended or adjusted under 35 U.S.C. 154(b) by 0 days.

(21) Appl. No.: 15/337,311

(22) Filed: Oct. 28, 2016

(51) Int. Cl.
*G02B 6/38* (2006.01)
(52) U.S. Cl.
CPC ........... *G02B 6/3831* (2013.01); *G02B 6/387* (2013.01); *G02B 6/3821* (2013.01); *G02B 6/3861* (2013.01); *G02B 6/3871* (2013.01); *G02B 6/3898* (2013.01)
(58) Field of Classification Search
CPC .................................................. G02B 6/3871
See application file for complete search history.

(56) References Cited

U.S. PATENT DOCUMENTS

| 6,238,101 | B1 | 5/2001 | Chen et al. |
| 6,287,018 | B1 | 9/2001 | Andrews et al. |
| 7,201,518 | B2 | 4/2007 | Holmquist |
| 8,439,577 | B2 * | 5/2013 | Jenkins ................. G02B 6/381 385/60 |
| 2004/0086236 | A1 | 5/2004 | Nelson |
| 2005/0213892 | A1 | 9/2005 | Barnes et al. |
| 2014/0068913 | A1 * | 3/2014 | Zimmel ............... G02B 6/3871 29/428 |
| 2015/0177097 | A1 | 6/2015 | Clarke et al. |
| 2016/0178854 | A1 * | 6/2016 | Nielson ................ G02B 6/3821 385/78 |

FOREIGN PATENT DOCUMENTS

EP        1072914 A2 *  1/2001    ............. G02B 6/381

OTHER PUBLICATIONS

International Search Report and Written Opinion PCT/US2017/055288 dated Jan. 23, 2018, 11 pgs.

* cited by examiner

*Primary Examiner* — Michelle R Connelly
(74) *Attorney, Agent, or Firm* — Adam R. Weeks (57) ABSTRACT

A method for assembling a fiber optic connector utilizes a manufacturing fixture with multiple fingers that are removably affixed to an outer surface of a ferrule holder having at least one keying feature. A core position of an optical fiber relative to a ferrule retained by the ferrule holder is determined, followed by relative rotation between the ferrule holder and the manufacturing fixture to place the core position in a preferred angular orientation, and a housing is affixed over the ferrule holder the maintain the angular orientation of the core position, followed by removal of the manufacturing fixture. A ferrule holder includes at least one keying feature and at least one channel extending in a circumferential direction along an outer surface of a body structure, with a plurality of recesses extending in an axial direction along the outer surface.

14 Claims, 10 Drawing Sheets

CONNECTOR TUNING METHOD AND FERRULE FOR FIBER OPTIC CABLE ASSEMBLIES

BACKGROUND

The disclosure relates to fiber optic connectors, and more particularly to connector tuning methods for fiber optic connectors and ferrules permitting tuning of fiber optic cable assemblies.

Optical fibers are useful in a wide variety of applications, including the telecommunications industry for voice, video, and data transmission. In a telecommunications system that uses optical fibers, there are typically many locations where fiber optic cables that carry the optical fibers connect to equipment or other fiber optic cables.

To conveniently provide these connections, fiber optic connectors ("connectors") are often provided on the ends of fiber optic cables. Fiber optic connectors are used to optically connect one optical fiber to another, or to connect an optical fiber to another device such as an optical transmitter or an optical receiver. A fiber optic cable typically carries the optical fiber. The connector and the fiber optic cable constitute a cable assembly. The connector is typically formed by engaging an inner housing with an outer housing, wherein the inner housing supports a ferrule.

An important property of a connector is its ability to provide an efficient optical connection, i.e., an optical connection whereby the optical loss (also called "insertion loss") due to the connection is minimal. This efficiency is referred to in the art as the "coupling efficiency."

It is advantageous to "tune" connectors in a factory where connectors are assembled to minimize optical loss in the field. The tuning process involves detection of the fiber-ferrule concentricity (also referred to as "fiber core to ferrule" concentricity), i.e., the offset between the optical fiber core and the true center of the ferrule in which the optical fiber is supported. A known method for tuning involves measuring insertion loss of a connector mated to a master connector having a fiber core position of known magnitude and direction with the master core direction being relative to a mechanical key. The connector being tested may be rotationally "tuned" to maximize optical throughput and locked in the as-rotated position.

Tuning may also be performed using other contact methods that do not involve making a connection to a master connector. Alternatively, non-contact methods may be employed to determine fiber-ferrule concentricity (e.g., such as disclosed in U.S. Patent Application Publication No. 2015/0177097, which is hereby incorporated by reference herein). The contact methods not involving connection to a master connector, as well as the non-contact methods, typically require a substantial portion of the outer surface of the ferrule to be exposed. Because the inner housing in most connector designs covers substantially all (e.g., about 90%) of the ferrule length, these measurement methods normally require the fiber-ferrule concentricity to be measured without the inner housing in place. Accommodating such a requirement in cable assembly processes may add costs, complexities, and/or inefficiencies.

Some early connector designs included external keys that were installed to set the "tuned" position. Later connector designs allowed a housing to be installed after tuning, and still later connector designs provided for a fiber-ferrule subassembly to be pushed rearward (i.e., axially displaced) to enable rotational indexing of the ferrule.

Connector designs that use separate external keys have been mostly abandoned due to their size, cost, and complexity. Installing an inner housing after tuning is also not preferred, since excess fiber generally needs to be absorbed by the cable structure, and it can be inefficient to measure fiber-ferrule concentricity without an inner housing in place. Tuning by indexing a ferrule when axially displaced also has the drawback in that an end user may inadvertently alter the tuning position set at the factory.

SUMMARY

Aspects of the present disclosure provide methods of rotationally tuning components of a fiber optic connector to reduce optical losses attributable to imperfect fiber-ferrule concentricity. In exemplary aspects, relative rotation is effected between a ferrule holder of a fiber optic connector and a manufacturing fixture to cause a core position of an optical fiber that is held by a ferrule, which in turn is held by the ferrule holder, to be oriented in a desired angular orientation (e.g., in one of four quadrants). Cooperation between features of the ferrule holder and the manufacturing fixture enable one or more rotational positions to be temporarily maintained during measurement of insertion loss. When a preferred angular orientation of the core position is attained, a connector housing is affixed over the ferrule holder to cause at least one keying feature of the ferrule holder to mate with at least one complementary positioning feature of the connector housing to rotationally lock the ferrule holder. Thereafter, the manufacturing fixture may be removed. This method permits rotational tuning of a fiber-ferrule assembly during connector installation (thereby improving optical throughput of the resulting connector), with the manufacturing fixture serving to maintain a preferred angular orientation of the fiber core position until the housing is engaged with the ferrule holder. These functions may be performed without necessarily altering the overall shape or dimensions of the connector, due to the removable character of the manufacturing fixture.

A ferrule holder that facilitates performance of the foregoing method is further provided. An exemplary ferrule holder includes a body structure, at least one keying feature configured to cooperate with a connector housing, and at least one channel and multiple recesses defined in an outer surface of the body structure to cooperate with features of a manufacturing fixture. The at least one channel extends in a circumferential direction along the outer surface to permit relative rotation of the ferrule holder and at least one finger of a manufacturing fixture. Each recess extends in an axial direction along the outer surface, and is configured to retain a finger of the manufacturing fixture to temporarily maintain a rotational position between the ferrule holder and the manufacturing fixture.

In one embodiment of the disclosure, a method for assembling a fiber optic connector is provided. The method comprises forming an assembly comprising a ferrule holder, an optical fiber, a ferrule, a spring, a connector body, and a manufacturing fixture. The ferrule holder comprises at least one keying feature on an outer surface of the ferrule holder. The optical fiber extends through a bore defined in the ferrule. A portion of the ferrule is retained within a bore defined in the ferrule holder. The spring is arranged between the ferrule holder and the connector body. The manufacturing fixture comprises a plurality of fingers that extend in a radially inward direction to be received by the outer surface of the ferrule holder. The method also comprises determining a core position of the optical fiber relative to the ferrule.

The method also comprises effecting relative rotation between the ferrule holder and the manufacturing fixture to cause the core position to be oriented in a preferred angular orientation. The method also comprises affixing a housing over the ferrule holder while the plurality of fingers of the manufacturing fixture are received by the outer surface of the ferrule holder, wherein the at least one keying feature of the ferrule holder and at least one complementary positioning feature of the housing can maintain the preferred angular orientation of the core position when the housing is affixed over the ferrule holder. The manufacturing fixture may be embodied in a removable clip defining the plurality of fingers in certain embodiments, or in a tool including selectively operable gripper jaws defining the plurality of fingers in other embodiments.

In accordance with another embodiment of the disclosure, a fiber optic cable assembly is provided. The fiber optic cable assembly is fabricated by a method including forming an assembly comprising a ferrule holder, an optical fiber, a ferrule, a spring, a connector body, and a manufacturing fixture. The ferrule holder comprises at least one keying feature on an outer surface of the ferrule holder. The optical fiber extends through a bore defined in the ferrule. A portion of the ferrule is retained within a bore defined in the ferrule holder. The spring is arranged between the ferrule holder and the connector body. The manufacturing fixture comprises a plurality of fingers that extend in a radially inward direction to be received by the outer surface of the ferrule holder. The method further includes determining a core position of the optical fiber relative to the ferrule. The method further includes effecting relative rotation between the ferrule holder and the manufacturing fixture to cause the core position to be oriented in a preferred angular orientation. The method additionally includes affixing a housing over the ferrule holder while the plurality of fingers of the manufacturing fixture are received by the outer surface of the ferrule holder, wherein the at least one keying feature of the ferrule holder and at least one complementary positioning feature of the housing can maintain the preferred angular orientation of the core position when the housing is affixed over the ferrule holder.

In accordance with another embodiment of the disclosure, a ferrule holder for a fiber optic connector is provided. The ferrule holder includes a body structure comprising a first end, a second end, a first body portion and a second body portion arranged between the first end and the second end. A ferrule holder bore extends between the first end and the second end. The first body portion comprises a greater cross-sectional diameter than the second body portion to define a spring seating surface between the first end and the second end. At least one keying feature extends radially outward from the body structure. At least one channel extends in a circumferential direction along an outer surface of the body structure. The at least one channel comprises a plurality of recesses extending in an axial direction along the outer surface of the body structure.

Embodiments of a fiber optic cable assembly tuned and assembled according to methods disclosed herein, and/or incorporating a ferrule holder as disclosed herein, are provided below. An exemplary fiber optic cable assembly includes a fiber optic cable having at least one optical fiber, and a fiber optic connector disclosed herein installed on the fiber optic cable.

Additional features and advantages will be set forth in the detailed description which follows, and in part will be readily apparent to those skilled in the technical field of optical connectivity. It is to be understood that the foregoing general description, the following detailed description, and the accompanying drawings are merely exemplary and intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the description serve to explain principles and operation of the various embodiments. Features and attributes associated with any of the embodiments shown or described may be applied to other embodiments shown, described, or appreciated based on this disclosure.

DETAILED DESCRIPTION

Figure 1:
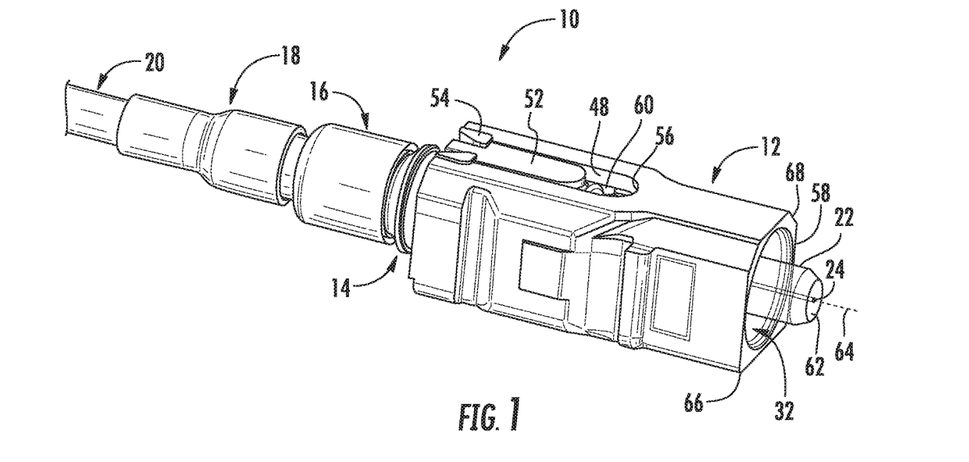
FIG. 1 a perspective view of an example of a fiber optic connector.

Various embodiments will be further clarified by examples in the description below. In general, the description relates to connector tuning methods for fiber optic connectors and ferrule holders permitting tuning of fiber optic cable assemblies. One example of a fiber optic connector 10 (also referred to as "optical fiber connector 10", "optical connector 10", or simply "connector 10") is shown in FIG. 1, with an exploded view of the connector 10 being provided in FIG. 2. Although the connector 10 is shown in the form of a SC-type connector, the features described below may be applicable to different connector designs, such as ST and/or LC-type connectors, for example, and other connector designs.

Figure 2:
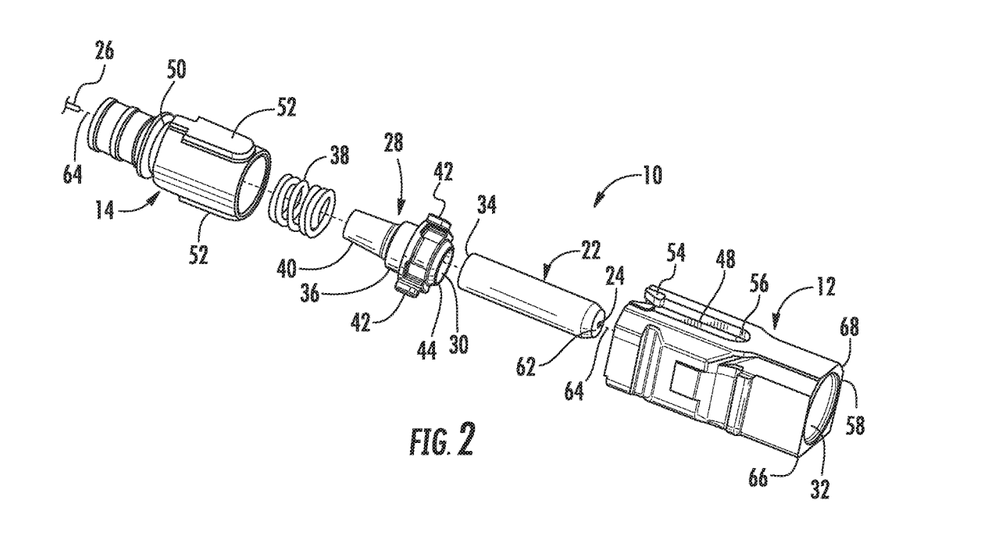
FIG. 2 is an exploded view of the fiber optic connector of FIG. 1.

As shown in FIGS. 1 and 2, the connector 10 includes a ferrule 22, a ferrule holder 28 from which the ferrule 22 extends, a housing 12 having a cavity in which the ferrule holder 28 is received, and a connector body 14 configured to retain the ferrule holder 28 within the housing 12. The connector body 14 may also be referred to as "retention body 14" or "crimp body 14". One portion of the connector body 14 is received in the housing 12. Another portion of the connector body 14 is received by a crimp band 16 (also referred to as "crimp ring 16"). A strain relief assembly 18 is positioned over the crimp band 16, with the strain relief assembly 18 further receiving a fiber optic cable 20 (hereinafter "cable 20"). FIG. 2 shows various components of the connector 10 including (and spanning between) the connector body 14 and the housing 12, but omits the crimp band 16, the strain relief assembly 18, and the cable 20 for simplicity of illustration. Persons skilled in optical connectivity will appreciate how a cable 20 according to various different cable designs may be terminated with the connector 10.

As will be discussed in more detail below, the ferrule holder 28 includes features configured to cooperate with a manufacturing fixture to enable one or more rotational positions of the ferrule holder 28 to be temporarily maintained during measurement of insertion loss. Upon attainment of a preferred angular orientation of the core position of an optical fiber 26 that is retained (i.e., secured) in the ferrule 22, the housing 12 is affixed over the ferrule holder 28 that supports the ferrule 22 to cause at least one keying feature on the ferrule holder 28 to mate with at least one complementary positioning feature of the housing 12 to rotationally lock the ferrule holder 28. Before discussing these aspects in further detail, a general discussion of the connector 10 is provided in FIGS. 1 and 2, and steps of a method for assembling and rotationally tuning a connector are described thereafter in connection with FIGS. 5-10.

As shown in FIGS. 1 and 2, the ferrule 22 includes a ferrule bore 24 (or "micro-hole") configured to support the optical fiber 26, which is secured in the ferrule bore 24 using an adhesive (e.g., epoxy). The ferrule holder 28 includes a ferrule holder bore 30 from which the ferrule 22 extends. More specifically, a back end 34 of the ferrule 22 is received in the ferrule holder bore 30 defined in (at least) a first portion 36 of the ferrule holder 28, and is secured therein in a known manner (e.g., press-fit, adhesive, molding the ferrule holder 28 over the back end 34 of the ferrule 22, etc.). The ferrule 22 and ferrule holder 28 may even be a monolithic structure in some embodiments. For convenience, the term "ferrule assembly" may be used to refer to the combination of the ferrule 22 and ferrule holder 28, regardless of whether these elements are separate components secured together or different portions of a monolithic structure. Notably, FIG. 1 shows the ferrule 22 as being transparent in character to illustrate the ferrule bore 24, but it is to be understood that the ferrule 22 may be fabricated of an opaque material as shown in FIG. 2.

The ferrule holder 28 is biased to a forward position within a cavity 32 of the housing 12 by a spring 38, which extends over a second portion 40 of the ferrule holder 28 that has a reduced cross-sectional diameter/width compared to the first portion 36. The ferrule holder 28 further includes multiple keying features 42 (e.g., first and second keying features 42) that protrude radially outward and are arranged proximate to a front end 44 of the ferrule holder 28. A transition 46 between the first portion 36 and the second portion 40 of the ferrule holder 28 serves as a spring seating surface for receiving the spring 38. The spring 38 also interacts with an internal geometry of the connector body 14, which may be secured to the housing 12 using a snap-fit method or other attachment methods.

FIGS. 1 and 2 illustrate a rear portion of the housing 12 having cut-outs or slots 48 on opposite surfaces so as to define a split shroud. The connector body 14 is generally tubular in shape with a medial shoulder 50 arranged between different diameter portions. The connector body 14 further includes protrusions 52 (which may embody tabs) configured to be snapped into the slots 48 on the housing 12 and retained therein due to the geometries of the components. Retention of the protrusions 52 within the slots 48 is specifically promoted by retention features 54 associated with the housing 12 and conferring a slightly reduced slot width along a leading edge of each slot 48. Each slot 48 further includes a terminus 56 arranged between the retention features 54 and a front end 58 (or "distal end 58") of the housing 12. As shown in FIG. 1, the slots 48 of the housing 12 are longer (e.g., at least about 10%, about 15%, about 20%, about 25%, about 30%, or about 35% longer) than the protrusions 52 of the connector body 14, such that when the protrusions 52 are received by the slots 48, a gap 60 remains between the terminus 56 and a protrusion 52. As will be explained in more detail below, each gap 60 is configured to receive at least one finger of a manufacturing fixture during rotational tuning of the connector 10 to maintain the components of the connector (including the keying features 42 of the ferrule holder 28) in a preferred angular orientation prior to and during affixation of the housing 12 over the ferrule holder 28.

When the connector 10 is assembled as shown in FIG. 1, a front end 62 of the ferrule 22 projects beyond a front end 58 of the housing 12. The front end 62 of the ferrule 22 presents the optical fiber retained therein for optical coupling with a mating component (e.g., another fiber optic connector; not shown), with the ferrule 22 serving to generally align the optical fiber 26 in an axial direction along a longitudinal axis 64. The housing 12 includes a roughly rectangular cross-sectional shape perpendicular to the longitudinal axis 64 (shown in FIG. 2), with two adjacent non-beveled corners 66 and two adjacent beveled corners 68 embodying transitions between four outer faces of the housing 12 proximate to the front end 58 of the housing 12. The combination of the non-beveled corners 66 and the beveled corners 68 serves to ensure that the connector 10 must be in a specific orientation when received by a connector receiving structure (e.g., a female connector, a socket, a receptacle, etc., not shown).

Figure 3A:
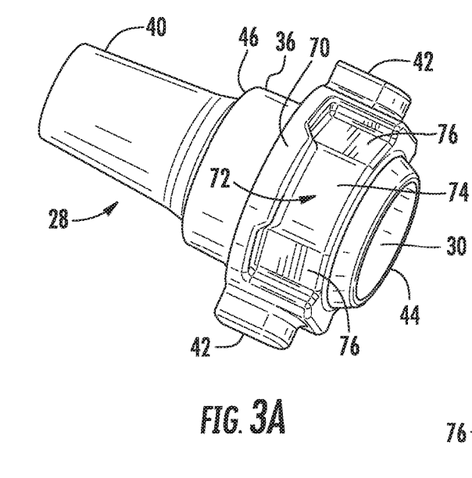
FIG. 3A is a perspective view of a ferrule holder of the fiber optic connector of FIGS. 1 and 2.
Figure 3B:
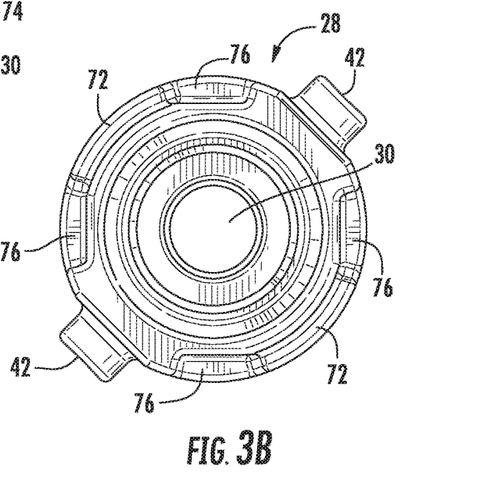
FIG. 3B is a front elevation view of the ferrule holder of FIG. 3A.
Figure 4:
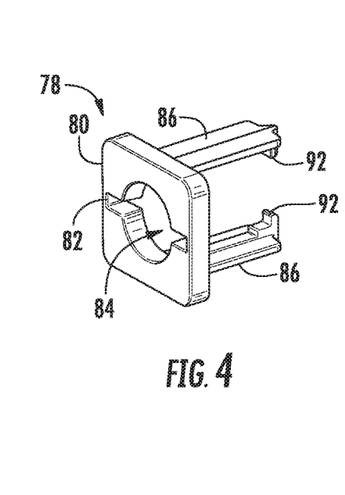
FIG. 4 is a perspective view of an example of a manufacturing fixture embodied in a clip useable with the ferrule holder of FIGS. 3A and 3B to facilitate rotational tuning.
Figure 5:
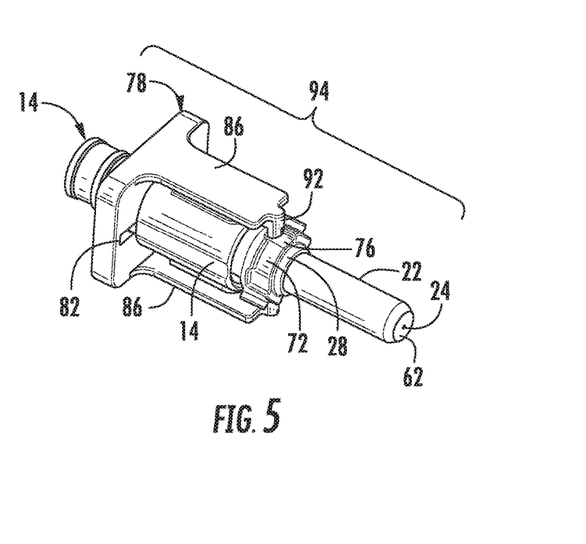
FIG. 5 is a perspective view of a first assembly including the ferrule holder and ferrule of the fiber optic connector of FIG. 2 and including the clip of FIG. 4 engaged with the ferrule holder.
Figure 13:
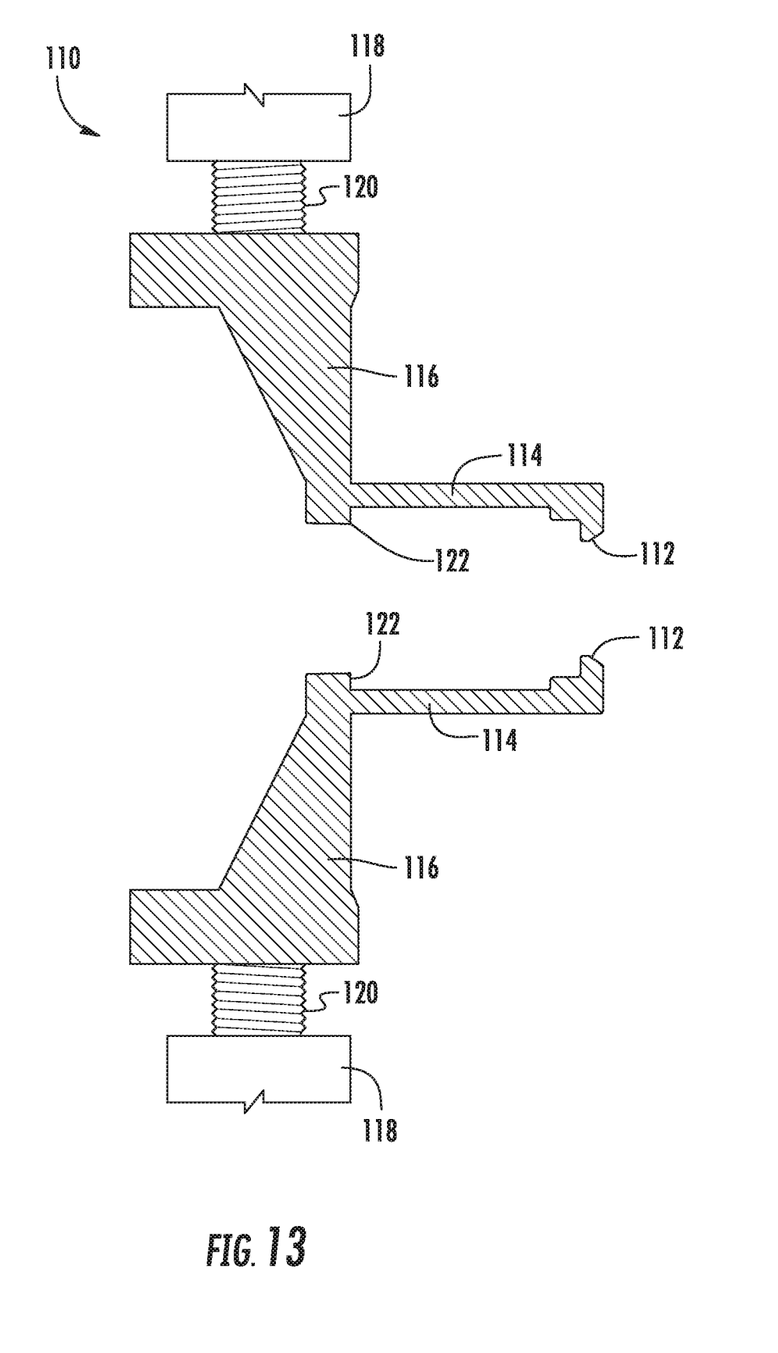
FIG. 13 is a schematic cross-sectional view of at least a portion of a manufacturing fixture embodied in a tool including selectively operable gripper jaws defining multiple fingers configured to engage an outer surface of a ferrule holder during performance of a rotational tuning method as disclosed herein.

FIGS. 3A and 3B illustrate features of the ferrule holder 28 of FIG. 2 in additional detail. The ferrule holder 28 includes a body structure 70 that incorporates the first portion 36 and the second portion 40 with a transition 46 therebetween, as well as the keying features 42 that protrude radially outward generally between the second portion 40 and the front end 44 of the ferrule holder 28. The ferrule holder bore 30 has a circular cross-sectional shape and is defined in at least the front end 44 of the body structure 70. The body structure 70 further defines channels 72 each having an arc-like shape and extending in a circumferential direction around a portion of an outer circumference of the body structure 70. Each channel 72 includes a floor surface 74 and includes two associated recesses 76 (i.e., a pair of recesses 76) extending parallel to a longitudinal axial direction. In certain embodiments, each recess 76 includes a longitudinal dimension that exceeds a longitudinal dimension of the channel 72 associated therewith. In certain embodiments, each recess 76 includes a depth that exceeds a depth of the channel 72 associated therewith. Depth of the recesses 76 and/or the channel 72 may or may not be constant, but in certain embodiments, the channel 72 may include a first average depth, and each recess 76 may include a second average depth that is greater than the first average depth. As shown in FIG. 3B, first and second channels 72 are discontinuous relative to one another, with recesses 76 arranged at terminal ends of each channel 72, such that each channel 72 has an associated pair of recesses 76, providing a total of four recesses 76 that are spaced ninety degrees apart. More specifically, a centerline (parallel to the axial direction) of each recess 76 is separated from a centerline (parallel to the axial direction) of each other recess 76 by at least about ninety degrees relative to a 360 degree outer circumference of the body structure 70. Each channel 72 is configured to receive at least one finger of a manufacturing fixture (e.g., a removable clip as shown in FIGS. 4 and 5 or a tool including selectively operable gripper jaws as shown in FIG. 13) that may be used during a rotational tuning method as described herein. Each keying feature 42 of the ferrule holder 28 is further configured to cooperate with at least one complementary positioning feature arranged along an interior surface of the housing 12 (of FIGS. 1 and 2), as described in more detail below.

Although FIGS. 3A and 3B illustrate the channels 72 as being discontinuous relative to one another, in certain embodiments a ferrule holder may include a single channel extending around all or substantially all of the outer circumference thereof, with multiple recesses being associated with (e.g., being accessible from) the single channel. In certain embodiments, each channel includes two associated recesses or multiple pairs of recesses. In one example, a ferrule holder may include four or more recesses, which may be associated with a single channel that extends around the entire circumference of the body structure. Regardless of whether a ferrule holder includes a single channel or multiple discontinuous channels, different numbers and/or spacing of recesses may be provided, relative to the number and spacing of recesses 76 shown in FIGS. 3A and 3B.

FIG. 4 illustrates one example of a manufacturing fixture embodied in a clip 78 configured to cooperate with the ferrule holder 28 of FIGS. 2-3B to facilitate rotational tuning without interfering with placement of the housing 12 of FIGS. 1 and 2 over the ferrule holder 28. The clip 78 includes a generally rectangular body 80 having thinned regions 82 along lateral edges thereof and defining a central aperture 84, with two opposing horizontal arms 86 extending (e.g., cantilever-style) in a lateral direction from the body 80. A terminal end of each arm 86 includes a finger 92 extending in a radially inward direction (e.g., upward or downward relative to the horizontal arms 86) toward a longitudinal axis (not shown) extendable through the aperture 84. The purpose of the thinned regions 82 is to permit the body 80 to be split (either manually or with a tool facilitating cutting or breakage of the body) into two portions to permit the clip 78 to be removed from a fiber optic connector when rotational tuning is complete and after a housing 12 is affixed over the ferrule holder 28. To this end, the clip 78 may be referred to as a "sacrificial clip". The fingers 92 are configured to be received in channels 72 and associated recesses 76 of the ferrule holder 28, as shown in FIG. 5.

FIG. 5 illustrates a first assembly 94 including the connector body 14, ferrule holder 28, and ferrule 22 of FIG. 2, and including the clip 78 of FIG. 4 engaged with the ferrule holder 28. The spring 38 (see FIG. 2) may also be included in the first assembly, but is not shown in FIG. 5 to simplify illustration. As shown, a portion of the connector body 14 is inserted through the aperture of the clip 78 to cause the body of the clip 78 to abut the medial shoulder 50 (shown in FIG. 2) of the connector body 14. Arms 86 extend forward from the body 80 to support the fingers 92 within longitudinal recesses 76 associated with the channels 72 defined in the ferrule holder 28. Since each recess 76 includes a longitudinal dimension that exceeds a longitudinal dimension of the channel 72 associated therewith, and the internal spring 38 (shown in FIG. 2) biases the ferrule holder 28 to a forward state, the fingers 92 are maintained in position within the respective recesses 76 unless the ferrule holder 28 is pressed rearward to enable relative rotation between the fingers 92 and the ferrule holder 28.

Figure 6:
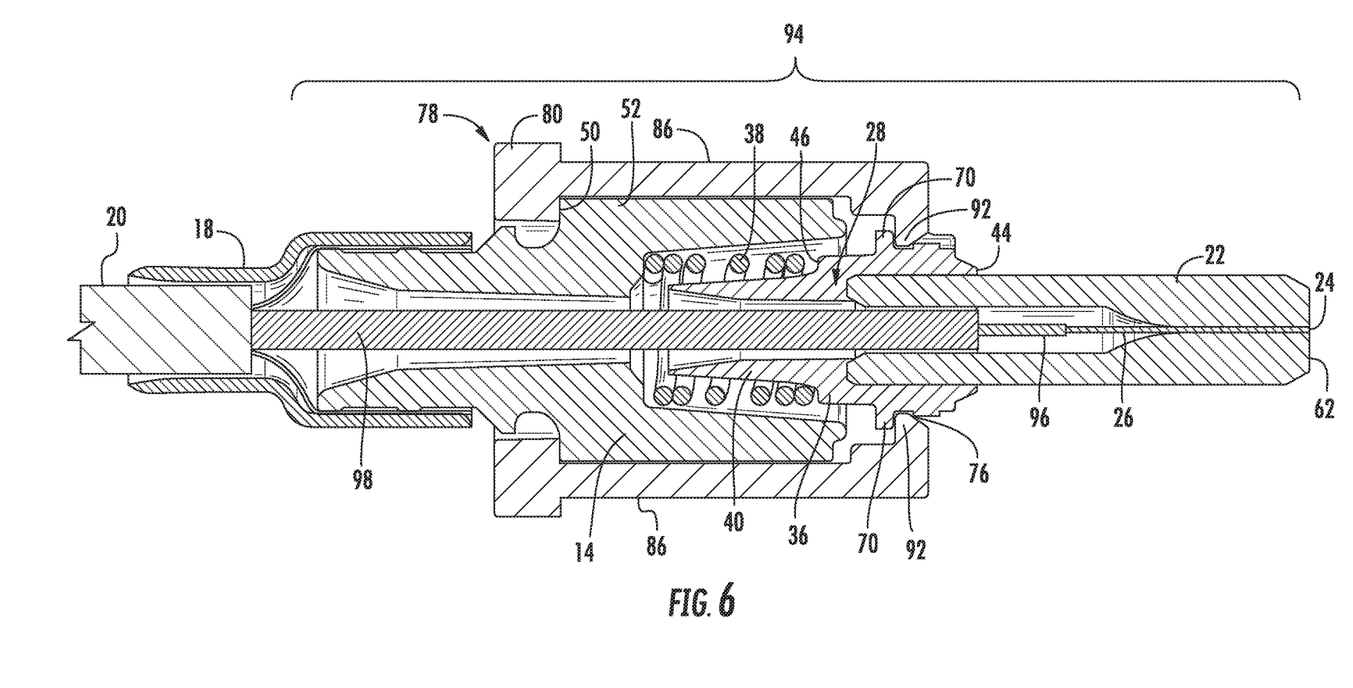
FIG. 6 is a cross-sectional view of the first assembly of FIG. 5 incorporating a fiber optic cable.

FIG. 6 is a cross-sectional view of the first assembly 94 of FIG. 5 incorporating a fiber optic cable 20 retained by a crimp band 16. The cable 20 is merely an example to facilitate discussion, and may include an outer jacket, an inner jacket, and strength members such as aramid yarn (not shown) all arranged about the optical fiber 26, which includes a coating 96 and a buffer layer 98 (or "tight buffer"). A portion of the optical fiber 26 devoid of coating 96 extends through the ferrule bore 24 to abut a front end 62 of the ferrule 22. As shown, the body 80 of the clip 78 abuts the medial shoulder 50 of the connector body 14, and fingers 92 of the clip 78 are received within recesses 76 associated with channels arranged along a forward portion of a body structure 70 of the ferrule holder 28. The protrusions 52 associated with the connector body 14 are arranged proximate to arms 86 of the clip 78. The spring 38 extends between an inner surface of the connector body 14 and the second portion 40 of the ferrule holder 28 to contact the transition 46 between the second portion 40 and the first portion 36.

Figure 7A:
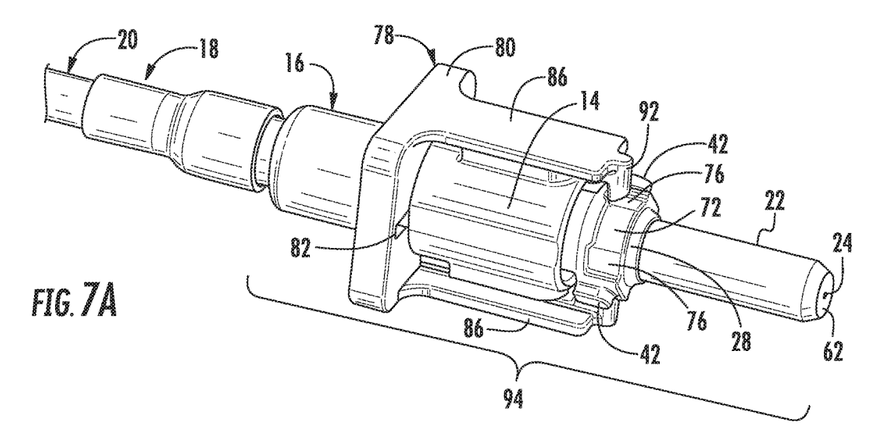
FIG. 7A is a perspective view of the first assembly of FIG. 6 with the clip arranged in a first terminal position relative to the ferrule holder.
Figure 7B:
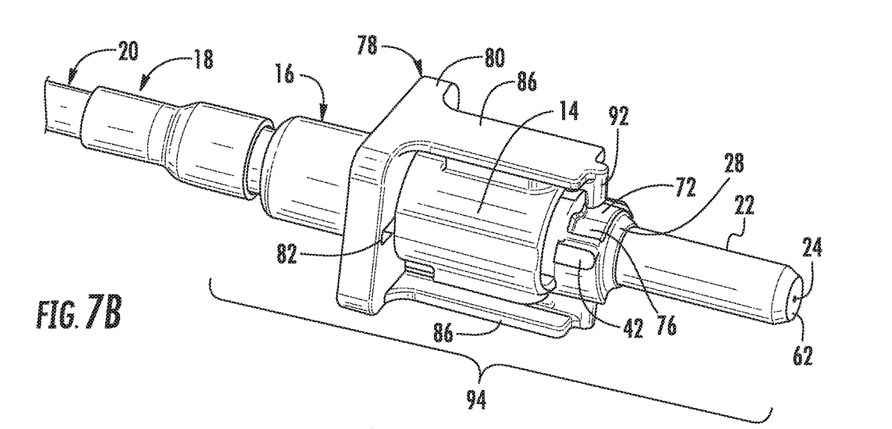
FIG. 7B is a perspective view of the first assembly of FIG. 7A with the clip arranged in a second intermediate position relative to the ferrule holder following relative rotation between the ferrule holder and the clip.
Figure 7C:
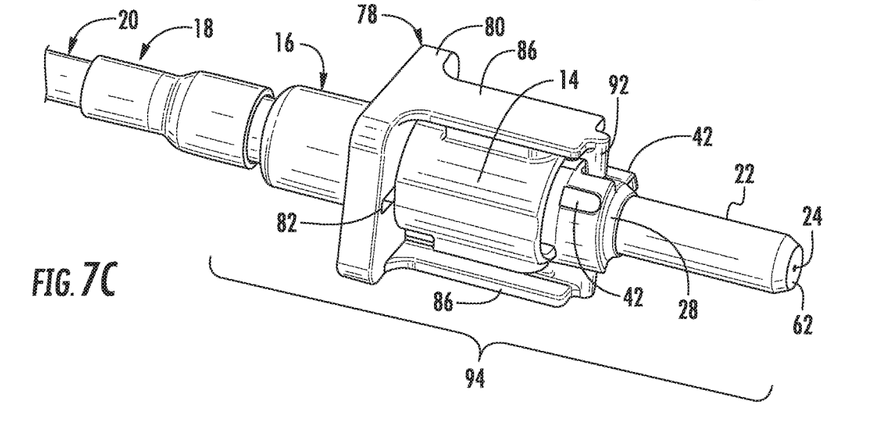
FIG. 7C is a perspective view of the first assembly of FIGS. 7A and 7B with the clip arranged in a third terminal position relative to the ferrule holder following further relative rotation between the ferrule holder and the clip.

FIGS. 7A-7C illustrate the first assembly 94 and associated components of FIG. 6 in three different positions of relative rotation between the clip 78 and the ferrule holder 28. In each instance, the connector body 14 maintains the same orientation as the clip 78, such that relative rotation between the ferrule holder 28 and the clip 78 also entails relative rotation between the ferrule holder 28 and the connector body 14. FIG. 7A illustrates the clip 78 in a first terminal position relative to the ferrule holder 28, with an (upper) finger 92 of the clip 78 received within a (right) recess 76 associated with an (upper) channel 72. FIG. 7B illustrates a condition in which the ferrule holder 28 (with the ferrule 22 retained therein) has been rotated in a clockwise direction by about forty-five degrees relative to the clip 78, such that the clip 78 is in a second, intermediate position within the (upper) finger 92 received within an intermediate portion of the channel 72. FIG. 7C illustrates a condition in which the ferrule holder 28 has been rotated in a clockwise direction by an additional forty-five degrees relative to the clip 78, such that the clip 78 is in a third terminal position relative to the ferrule holder 28, with the (upper) finger 92 received within another (left) recess 76 associated with the (upper) channel 100. Thus, comparing FIG. 7A to FIG. 7C, the ferrule holder 28 has rotated by a total of ninety degrees relative to the clip 78.

Figure 8:
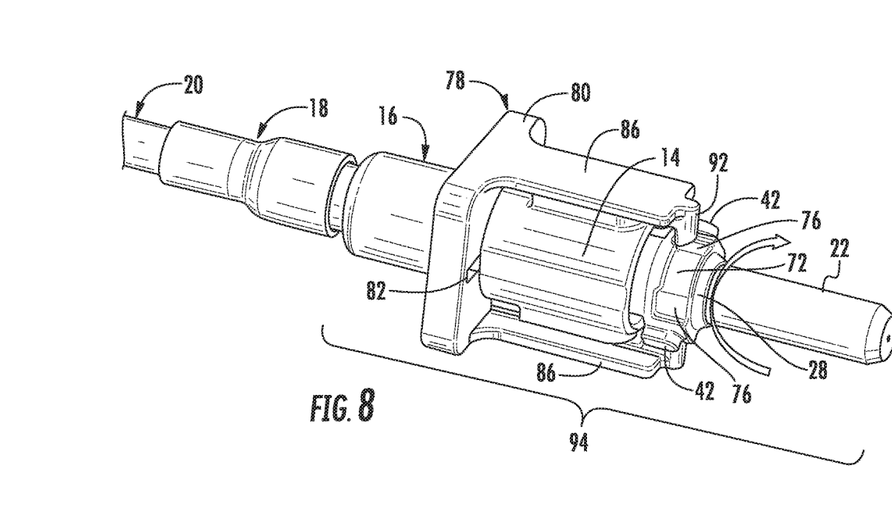
FIG. 8 is a perspective view of the first assembly of FIGS. 7A-7C with the clip in the first terminal position relative to the ferrule holder and including a curved arrow showing a direction of relative rotation.

During performance of a rotational tuning process, the first assembly 94 may be operatively coupled with a master connector (not shown) having a fiber core position of known magnitude and direction, and insertion loss may be measured with the first assembly 94 being in the first locked position shown in FIG. 7A (i.e., with the fiber core position arranged in a first of four possible quadrants), and subsequently measured with the first assembly 94 being in the third locked position shown in FIG. 7C (with the fiber core position arranged in a second of four possible quadrants). Thereafter, the entire first assembly 94 may be rotated (or flipped upside-down) as shown in FIG. 8 to enable measurement of insertion loss between the first assembly 94 and the master connector in another position (i.e., with the fiber core position arranged in a third of four possible quadrants). Finally, the ferrule holder 28 may be rotated by an additional ninety degrees relative to the clip 78, thereby causing the fingers 92 of the clip 78 to each transit from one recess 76 through a channel 72 to another recess 76 at an opposing end of the channel 72 to enable measurement of insertion loss between the first assembly 94 and the master connector in yet another position (i.e., with the fiber core position arranged in a fourth of four possible quadrants). In this manner, insertion loss may be measured for the first assembly 94 in each of four possible positions for a fiber core retained by the ferrule 22 and the ferrule holder 28, with relative positioning between the ferrule holder 28 and the connector body 14 being maintained by the clip 78. In certain embodiments, a range of possible insertion loss values may be calculated or empirically determined in advance, and attainment of a particular insertion loss value below a predetermined threshold may indicate that a specific fiber core is in a preferred angular orientation after one, two, or three insertion loss measurements, such that it may not be necessary to perform an insertion loss measurement for each of four rotational positions in every instance.

Figure 9:
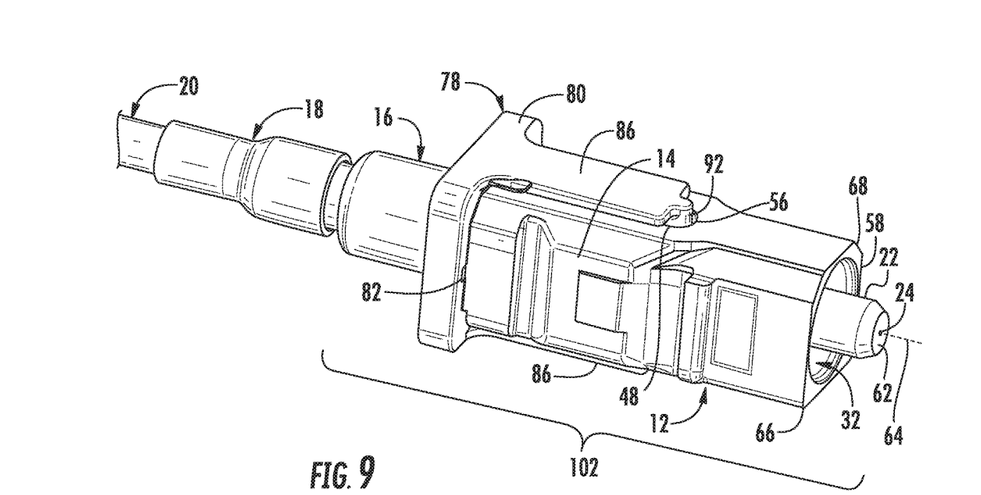
FIG. 9 is a perspective view of a second assembly including the first assembly of FIG. 8 received by a housing to rotationally lock the ferrule holder.
Figure 10:
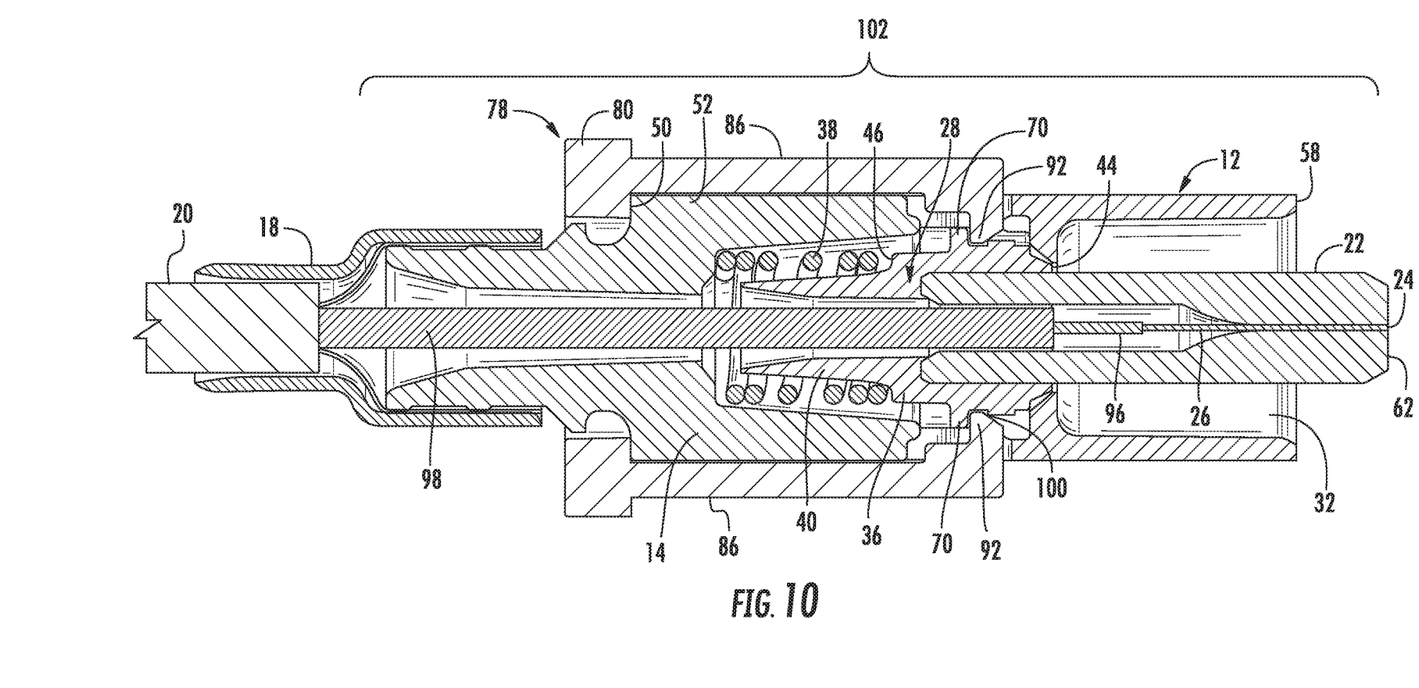
FIG. 10 is a cross-sectional view of the second assembly of FIG. 9.

When the first assembly 94 is oriented in a preferred angular orientation, the housing 12 may be affixed (e.g., by translation along the central longitudinal axis 64) over the ferrule holder 28 (shown in FIG. 8) and a portion of the connector body 14 (shown in FIG. 8) to form a second assembly 102, as shown in FIG. 9. Such action causes fingers 92 of the clip 78, as well as protrusions 52 (shown in FIG. 2) of the connector body 14, to be received by slots 48 defined in the housing 12, thereby positioning the fingers 92 proximate to termini 56 of the slots 48. With the housing 12 in place, relative rotation is prevented between the housing 12, the ferrule holder 28, and the connector body 14 due to positioning of the protrusions 52 of the connector body in the slots 48, and due to the keying features 42 (shown in FIGS. 2-3B) of the ferrule holder 28 being positioned in complementary positioning features 104 (shown in FIGS. 11A and 11B) of the housing 12. A cross-sectional view of the second assembly 102 of FIG. 9 is provided in FIG. 10, showing relative positioning between the housing 12, the ferrule holder 28, and the clip 78. As shown in FIG. 10, the ferrule 22 extends through the cavity 32 of the housing 12, with a portion of the ferrule 22 extending beyond a front end 58 of the housing 12, and portions of the housing 12 abutting the ferrule holder 28 and the clip 78. For sake of brevity, the same elements described in connection with FIG. 6 are not described again with respect to FIG. 10.

Figure 11A:
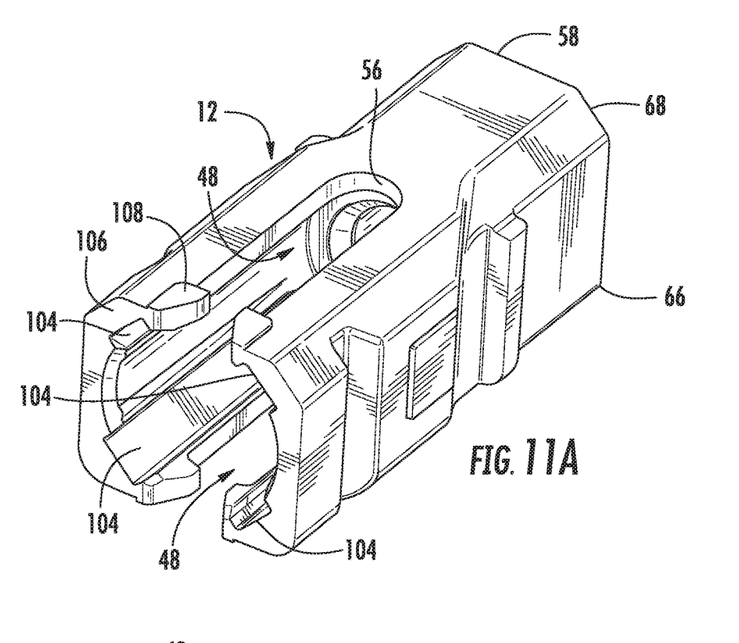
FIG. 11A is a perspective view of the housing of FIG. 9.
Figure 11B:
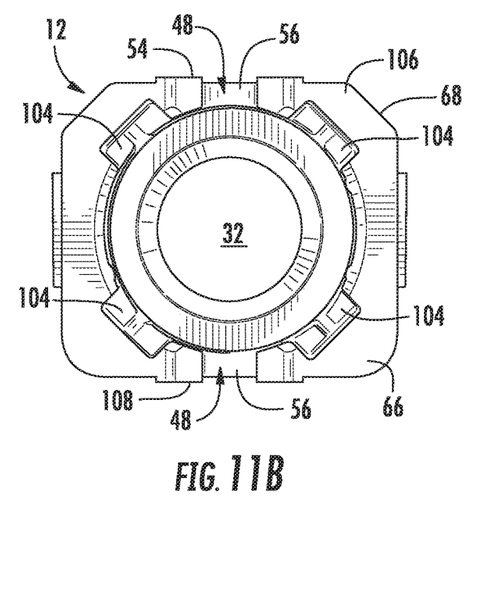
FIG. 11B is a front elevation view of the housing of FIG. 11A.
Figure 11C:
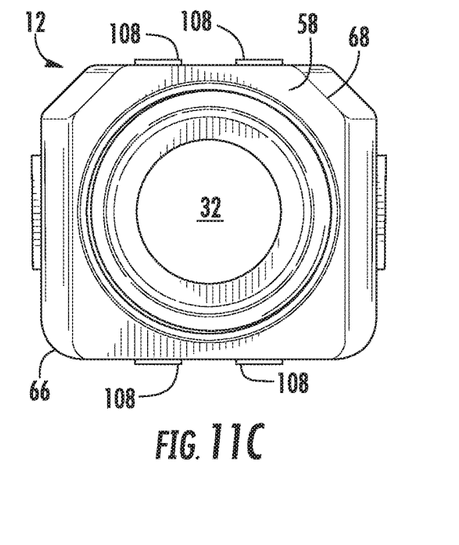
FIG. 11C is a rear elevation view of the housing of FIGS. 11A and 11B.

FIGS. 11A-11C provided perspective, front elevation, and rear elevation views, respectively, of the housing 12. The housing 12 includes the front end 58 and a rear end 106 (or "proximal end 106"), with the two opposing slots 48 being defined in a rear portion of the housing 12 and extending from the rear end 106 toward termini 56 arranged between the front and rear ends 58, 106. Presence of the opposing slots 48 causes the rear portion of the housing 12 to resemble a split shroud, as mentioned above. A rear portion of the housing 12 further defines four complementary positioning features 104 embodied in four longitudinal grooves or recesses defined along an inner surface of the housing 12 and being oriented ninety degrees apart from one another. The complementary positioning features 104 are configured to receive keying features of a ferrule holder, as described previously herein (e.g., the keying features 42 of the ferrule holder 28). A cavity 32 having a circular cross-sectional shape is defined through a front portion of the housing 12 proximate to the front end 58.

Consistent with the foregoing, a method for assembling an optical fiber connector 10 includes forming an assembly 94 including the ferrule holder 28, optical fiber 26, ferrule 22, spring 38, connector body 14, and a manufacturing fixture (e.g., the clip 78). The method also involves: determining a core position of the optical fiber 26 relative to the ferrule 22; effecting relative rotation between the ferrule holder 28 and the manufacturing fixture 78 (thereby also effecting relative rotation between the ferrule holder 28 and the connector body 14) to cause the core position of the optical fiber 26 to be oriented in a preferred angular orientation; and affixing the housing 12 over the ferrule holder 28 (and preferably also over a portion of the connector body 14) whereby a mating relationship between features of the ferrule holder 28 and the housing 12 prevents relative rotation between the ferrule holder 28 and the housing 12. The manufacturing fixture 78 includes the fingers 92 that cooperate with features (e.g., longitudinal recesses 76) of the ferrule holder 28 to temporarily maintain angular positioning of the ferrule holder 28 (e.g., relative to the connector body 14) prior to and during affixation of the housing 12 over the ferrule holder 28 and over a portion of the connector body 14. After the housing is affixed, a rotational position of the ferrule holder 28 is locked by cooperation between the keying features 42 of the ferrule holder 28 and the complementary positioning features 104 of the housing 12. Accordingly, the manufacturing fixture 78 is no longer necessary to maintain an angular position of the ferrule holder 28.

Additionally, the manufacturing fixture 78 is no longer necessary to maintain relative positioning between the connector body 14 and the ferrule holder 28. Relative rotation between the connector body 14 and the ferrule holder 28 is inhibited by arrangement of the protrusions 52 (shown in FIGS. 2-3B) of the connector body 14 in the slots 48 (shown in FIGS. 11A and 11B) of the housing 12, and by arrangement of the keying features 42 of the ferrule holder 28 in the complementary positioning features 104 (e.g., recesses) of the housing 12. Thus, the manufacturing fixture 78 may then be removed from the fiber optic connector 10.

Figure 12:
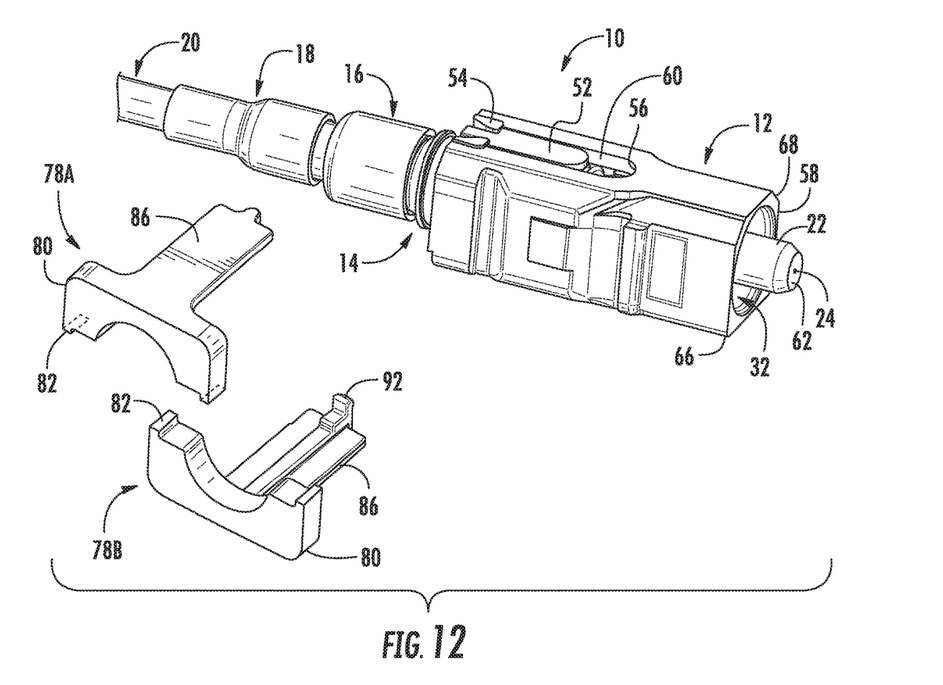
FIG. 12 is a perspective view of the second assembly of FIG. 9 following separation of the clip into two portions and removal of the separated portions of the clip from the remainder of the assembly.

In the embodiment shown, where the manufacturing fixture is in the form of a clip 78, the clip 78 may be split along the thinned regions 82 (either manually or with a tool facilitating cutting or breakage of the body 80) to divide the clip 78 into two parts 78A, 78B (each having a portion of the body 80, one arm 86, and one finger 92) as shown in FIG. 12 to facilitate removal from the connector 10. Following removal of the clip 78 from the connector 10, the gaps 60 (previously receiving fingers 92 of the clip 78) are visible between the terminus 56 of each slot 48 and the protrusion 52 received therein. For sake of brevity, the same elements described in connection with FIG. 1 are not described again with respect to FIG. 12.

Although the preceding embodiment involved use of a manufacturing fixture embodied in a clip 78 to maintain a preferred angular orientation of the core position of an optical fiber prior to engagement of a connector housing with a ferrule holder and a connector body, in certain embodiments a manufacturing fixture may be embodied in a tool including selectively operable gripper jaws defining a plurality of fingers. Use of selectively operable gripper jaws may avoid the need for splitting (e.g., via cutting or breakage) of the clip. One example of a manufacturing fixture embodied in a tool including selectively operable gripper jaws is shown in FIG. 13. The tool 110 includes fingers 112 supported by arms 114 that are supported by jaws 116 that may be selectively operated (e.g., moved together or apart) using actuators 118 and extension elements 120 (e.g., screws, rods, or the like). Transitions between the arms 114 and the jaws 116 include a protrusion 122 that may be used to abut the medial shoulder 50 (shown in FIGS. 2, 5 and 10) of the connector body 14 when the fingers 112 are arranged in contact with the ferrule holder 28. One skilled in the art will appreciate that a tool including selectively operable gripper jaws defining a plurality of fingers may be configured in various ways differing from the specific configuration shown in FIG. 13.

Figure 14A:
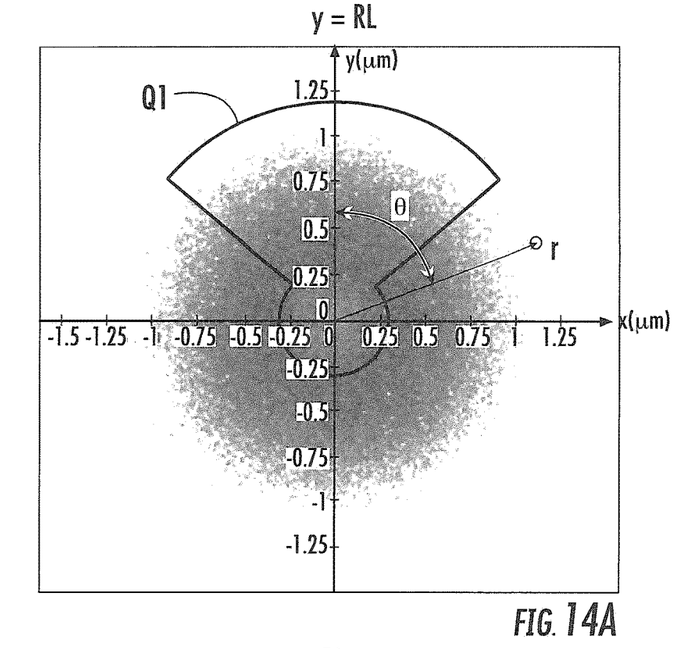
FIG. 14A is a scatter plot of fiber-ferrule concentricity based on Monte Carlo simulations, illustrating a substantially uniform distribution of fiber-ferrule concentricity measurements with angle, and showing an example first quadrant Q1.

FIG. 14A is a scatter plot of the fiber-ferrule concentricity (i.e., concentricity of an optical fiber core relative to the true center of the ferrule in which the optical fiber is supported). The points in the scatter plot have (r, θ) coordinates, wherein the r coordinate is the magnitude of the core offset measured relative to the ferrule center, while the θ coordinate shows the angular direction of the offset relative to a reference line RL. Cartesian x and y axes are also shown, with the units in microns (pin). The first quadrant Q1 is shown in the plot for reference.

The data points in the plot were created using a Monte-Carlo simulation of fiber-ferrule concentricity based on three major sources of error: a core/cladding offset in the optical fiber; an offset of the bare fiber section within the axial bore; and an offset of the axial bore relative to the true ferrule center. The plot shows a relatively uniform distribution of the data with angular coordinate θ. As can be seen from the plot of FIG. 14A, the position of a fiber core will fall into one of the four quadrants Q associated with four possible relative angular positions between a ferrule holder and a housing as described herein.

Thus, once the location of a fiber core in a given quadrant Q is determined, the question becomes what orientation a housing should have relative to the ferrule holder in order to tune the resulting connector, i.e., to increase or maximize the coupling efficiency or to reduce or minimize the insertion loss of a resulting cable assembly. If the orientation of the housing relative to the ferrule holder is random when forming a set of cable assemblies, the coupling efficiency between any two pairs of the cable assemblies in the set will vary over a relatively large range. As can be seen in the plot of FIG. 14A, this is because the core locations can range from being in the same quadrant (which results in a relatively high coupling efficiency) to being in opposite quadrants (which results in a relatively low coupling efficiency).

Figure 14B:
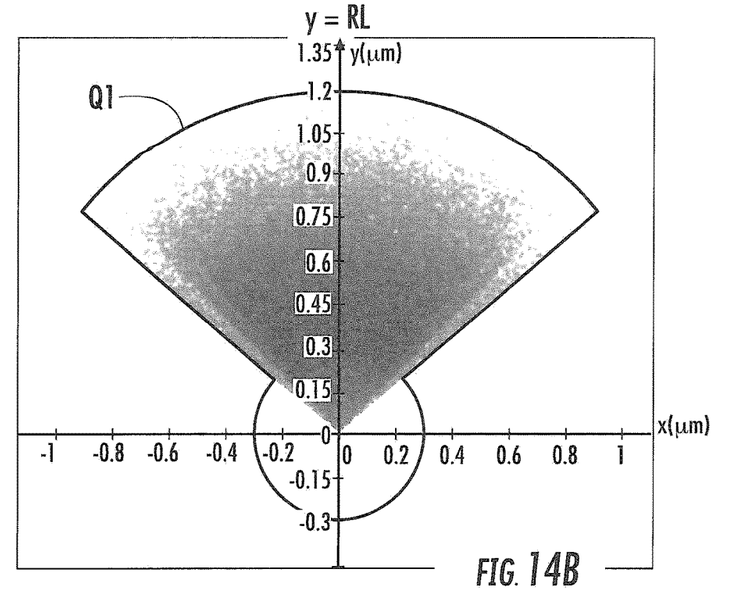
FIG. 14B is a scatter plot of the fiber-ferrule concentricity for tuned fiber optic connectors, wherein the outer housing is oriented with respect to the inner housing of each fiber optic connector so that the core locations of the respective optical fibers are all located in the first quadrant.

Thus, in order to maximize the coupling efficiency for a set of cable assemblies, each cable assembly has a tuned configuration whereby a ferrule holder and a housing are operably engaged so that the quadrant Q in which a fiber core is located is in the same position relative to the housing, as shown in FIG. 14B. In FIG. 14B, the core locations of the respective optical fibers are all located in the same quadrant. Positioning of a fiber core is maintained during rotational tuning detection steps using a manufacturing fixture (e.g., clip or tool) as disclosed herein, and positioning is maintained following removal of the manufacturing fixture by interaction between keying features of the ferrule holder and complementary positioning features of the housing.

It will be apparent to those skilled in the art that various modifications to the preferred embodiments of the disclosure as described herein can be made. For example, in certain embodiments, a housing may include more than four complementary positioning features configured to engage keying features of a ferrule holder in more than four possible orientations. In certain embodiments, keying features of a ferrule holder may be arranged as recesses and complementary positioning features of a housing may be arranged as protrusions.

Those skilled in the art will appreciate that other modifications and variations can be made without departing from the spirit or scope of the invention. Since modifications, combinations, sub-combinations, and variations of the disclosed embodiments incorporating the spirit and substance of the invention may occur to persons skilled in the art, the invention should be construed to include everything within the scope of the appended claims and their equivalents. The claims as set forth below are incorporated into and constitute part of this detailed description.

It will also be apparent to those skilled in the art that unless otherwise expressly stated, it is in no way intended that any method in this disclosure be construed as requiring that its steps be performed in a specific order. Accordingly, where a method claim below does not actually recite an order to be followed by its steps or it is not otherwise specifically stated in the claims or descriptions that the steps are to be limited to a specific order, it is no way intended that any particular order be inferred.

What is claimed is:

1. A method for assembling a fiber optic connector, the method comprising:
forming an assembly comprising a ferrule holder, an optical fiber, a ferrule, a spring, a connector body, and a manufacturing fixture, wherein:
the ferrule holder comprises at least one keying feature on an outer surface of the ferrule holder,
the optical fiber extends through a bore defined in the ferrule,
a portion of the ferrule is retained within a bore defined in the ferrule holder, the spring is arranged between the ferrule holder and the connector body, and
the manufacturing fixture comprises a plurality of fingers that extend in a radially inward direction to be received by the outer surface of the ferrule holder;
   determining a core position of the optical fiber relative to the ferrule;
   effecting relative rotation between the ferrule holder and the manufacturing fixture to cause the core position to be oriented in a preferred angular orientation; and
   affixing a housing over the ferrule holder while the plurality of fingers of the manufacturing fixture are received by the outer surface of the ferrule holder, wherein the at least one keying feature of the ferrule holder and at least one complementary positioning feature of the housing can maintain the preferred angular orientation of the core position when the housing is affixed over the ferrule holder; and
   removing the manufacturing fixture from the assembly after the affixing of the housing over the ferrule holder.

2. The method of claim 1, wherein the manufacturing fixture comprises a removable clip defining the plurality of fingers.

3. The method of claim 1, wherein the manufacturing fixture comprises a tool including selectively operable gripper jaws defining the plurality of fingers.

4. The method of claim 1, wherein the housing defines at least one slot, and the affixing of the housing over the ferrule holder causes at least one portion of the manufacturing fixture to extend into the at least one slot.

5. The method of claim 1, wherein the at least one keying feature of the ferrule holder comprises first and second protrusions extending radially outward from the ferrule holder, and the at least one complementary positioning feature of the housing comprises at least four recesses arranged along an inner surface of the housing.

6. The method of claim 1, wherein the plurality of fingers include a first finger and a second finger that opposes the first finger.

7. The method of claim 1, wherein the relative rotation between the ferrule holder and the manufacturing fixture comprises rotation of at least 90 degrees.

8. A fiber optic cable assembly comprising:
   a cable including an optical fiber;
   a ferrule including a bore in which the optical fiber is secured;
   a ferrule holder comprising:
      a body structure comprising a first end, a second end, a first body portion and a second body portion arranged between the first end and the second end, and a ferrule holder bore extending between the first end and the second end. wherein the first body portion comprises a greater cross-sectional diameter than the second body portion to define a spring seating surface between the first end and the second end, and wherein the ferrule is received within the ferrule holder bore;
      at least one keying feature extending radially outward from the body structure; and
      at least one channel extending in a circumferential direction along an outer surface of the body structure, wherein the at least one channel comprises a plurality of recesses extending in an axial direction along the outer surface of the body structure;
   a housing arranged over the ferrule holder and at least a portion of the ferrule, wherein the housing has a back end and a front end;
   a connector body coupled to the back end of the housing; and
   a spring arranged between the spring seating surface of the ferrule holder and the connector body, wherein:
      the ferrule extends from the front end of the housing;
      the connector body comprises at least one protrusion having a first length parallel to the axial direction and extending outward in a radial direction from the connector body;
      the housing defines at least one slot extending from the back end of the housing to a terminus of the at least one slot;
      the at least one slot receives the at least one protrusion; and
      the at least one slot comprises a second length that is at least about 25% longer than the first length, such that a gap is provided between the terminus of the at least one slot and the at least one protrusion received by the at least one slot, with the gap comprising a length equal to a difference between the second length and the first length.

9. The fiber optic cable assembly of claim 8, wherein a centerline parallel to the axial direction of each recess of the plurality of recesses is separated from a centerline parallel to the axial direction of each other recess of the plurality of recesses by at least about 90 degrees relative to a 360 degree outer circumference of the body structure.

10. The fiber optic cable assembly of claim 8, wherein:
   the at least one channel comprises discontinuous first and second channels each comprising an arc-like shape around a portion of an outer circumference of the body structure;
   the plurality of recesses includes a first pair of recesses associated with the first channel and includes a second pair of recesses associated with the second channel.

11. The fiber optic cable assembly of claim 8, wherein the at least one channel comprises a single channel extending around an entire outer circumference of the body structure.

12. The fiber optic cable assembly of claim 8, wherein the at least one keying feature comprises first and second keying features.

13. The fiber optic cable assembly of claim 8, wherein the plurality of recesses in the at least one channel of the ferrule holder comprises at least four recesses.

14. The fiber optic cable assembly of claim 8, wherein the at least one channel of the ferrule holder comprises a first average depth, and each recess of the plurality of recesses comprises a second average depth that exceeds the first average depth.

* * * * *

UNITED STATES PATENT AND TRADEMARK OFFICE
CERTIFICATE OF CORRECTION

PATENT NO. : 9,927,581 B1
APPLICATION NO. : 15/337311
DATED : March 27, 2018
INVENTOR(S) : Joel Christopher Rosson et al.

It is certified that error appears in the above-identified patent and that said Letters Patent is hereby corrected as shown below:

On the Title Page

Item [57], Line 9, delete "the maintain the angular" and insert -- to maintain the angular --, therefor.

In the Claims

Column 13, Line 52, Claim 8, delete "end." and insert -- end, --, therefor.

Signed and Sealed this
Nineteenth Day of May, 2020

Andrei Iancu
*Director of the United States Patent and Trademark Office*